(12) United States Patent
Somers

(10) Patent No.: US 7,821,534 B2
(45) Date of Patent: Oct. 26, 2010

(54) METHOD AND APPARATUS FOR DYNAMICALLY TESTING VIDEO EQUIPMENT

(75) Inventor: Steve Somers, Chino Hills, CA (US)

(73) Assignee: RGB Systems, Inc., Anaheim, CA (US)

( * ) Notice: Subject to any disclaimer, the term of this patent is extended or adjusted under 35 U.S.C. 154(b) by 154 days.

(21) Appl. No.: 12/115,494

(22) Filed: May 5, 2008

(65) Prior Publication Data

US 2008/0273089 A1 Nov. 6, 2008

Related U.S. Application Data

(63) Continuation of application No. 11/084,061, filed on Mar. 17, 2005, now Pat. No. 7,369,159.

(60) Provisional application No. 60/554,127, filed on Mar. 17, 2004.

(51) Int. Cl.
*H04N 17/02* (2006.01)
(52) U.S. Cl. .................. 348/181; 348/189
(58) Field of Classification Search .......... 348/181, 348/184, 175, 176, 178, 554, 187, 188, 177, 348/189–191; 702/67, 71, 74
See application file for complete search history.

(56) References Cited

U.S. PATENT DOCUMENTS

| 4,285,004 | A | * | 8/1981 | Morrison et al. ............ 348/176 |
| 4,495,519 | A | * | 1/1985 | Wahlquist ................... 348/183 |
| 4,513,318 | A | * | 4/1985 | Wilensky et al. ............ 348/181 |
| 5,572,444 | A | * | 11/1996 | Lentz et al. ................. 702/117 |
| 5,760,829 | A | * | 6/1998 | Sussmeier .................... 348/187 |
| 5,841,251 | A | * | 11/1998 | Vroemen et al. ............ 348/181 |
| 6,057,882 | A | * | 5/2000 | van den Branden Lambrecht et al. ......................... 348/192 |
| 6,741,277 | B1 | * | 5/2004 | Rau ........................... 348/181 |
| 6,992,696 | B1 | * | 1/2006 | Albertelli .................... 348/188 |
| 7,023,470 | B2 | * | 4/2006 | Braun ......................... 348/180 |
| 7,304,663 | B2 | * | 12/2007 | Albertelli .................... 348/188 |
| 2004/0265711 | A1 | * | 12/2004 | Robinson ..................... 430/30 |

* cited by examiner

*Primary Examiner*—Victor Kostak
(74) *Attorney, Agent, or Firm*—The Hecker Law Group, PLC

(57) ABSTRACT

A method and apparatus are presented for dynamically testing video equipment. One or more test patterns utilize different regions of video signal characteristics. Adjustment is made to the video characteristics of a region until a perceived parameter of the region matches a second region. A performance parameter of said video equipment is determined from said adjustment.

7 Claims, 4 Drawing Sheets

METHOD AND APPARATUS FOR DYNAMICALLY TESTING VIDEO EQUIPMENT

CROSS-REFERENCE TO RELATED APPLICATIONS

This application claims the benefit of priority from U.S. provisional patent application Ser. No. 60/554,127, filed Mar. 17, 2004, the specification and figures of which are expressly incorporated herein by reference.

CROSS-REFERENCE TO RELATED APPLICATIONS

This application is a continuation of U.S. patent application Ser. No. 11/084,061, filed Mar. 17, 2005, which claims the benefit of priority from U.S. Provisional Patent Application Ser. No. 60/554,127, filed Mar. 17, 2004, the specifications and figures of which are expressly incorporated by reference herein.

FIELD OF THE INVENTION

This invention relates to video test generators. More specifically the invention relates to the use of test patterns in evaluating display equipment.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights.

BACKGROUND

In the field of video technology, the modulation transfer function, or MTF, has been used to describe the ability of a display system to pass spatial detail information (i.e., high frequencies). MTF is usually described as a percentage of the full output range of a display system, with full output being considered 100% modulation.

Traditionally, MTF has been used in cathode ray tube (CRT) performance specifications as a method to specify usable visual bandwidth. Since direct-view, color CRTs include a spaced phosphor structure and shadow mask of some type. MTF testing is used to characterize the highest frequency of modulation or alternating white and black transitions. Early MTF test systems have used sine wave modulation to determine the peak-to-peak contrast obtainable from the display device. As the modulation frequency increases and the spatial distance between peaks and valleys decreases, a point is reached where the average contrast of the display device eventually rolls off to middle gray. At that point, no discernable detail survives.

Many high resolution (small dot triad pitch) CRTs have carried resolution specifications based on the number of pixels discernable at a modulation percentage of only 10% or 20%. While MTF is a term mostly known by display engineers, it is useful for characterizing the resolution of an entire system including the display device.

In general, display devices reproduce high frequency details along the horizontal axis of the image, since television and graphics systems still use traditional raster scanning methods to create, transmit, and re-create visual images, regardless of whether information is conveyed in the analog or digital domain. Therefore, the highest frequency demonstrable by a display device is one half the system clock frequency for fixed-resolution devices and one half the highest frequency of modulation for a CRT device, which specifies a particular percentage of MTF result (e.g., 10%) for its resolution specification. At this frequency, the maximum number of black to white transitions along the horizontal scanning axis is discernable. This translates into a field of vertical alternating lines, or pixels.

Within the video processor, or drive system, illuminated horizontal lines require the processor to attain full output and hold that level for a long period of time. To alternate pixels along one horizontal line time, the processor must rapidly transition from black video level (0%) to full white (100%) in the shortest time possible. The speed with which these full pixel excursions are accomplished along the horizontal scanning axis characterizes the system's, or display's, video bandwidth.

In FIG. 1A, columns 100 represent pixels at the highest value that a given display system can provide (ideally, "white") at the maximum displayable data rate, whereas columns 101 represent pixels at the lowest value (ideally, "black"). When viewed by row (e.g., rows 103), which corresponds to the linear data stream of the raster scanned video data, the pixels alternate between "white" and "black," or the nearest values that the display system can achieve.

Conversely, a horizontal white line on a raster-scanned display, whether a CRT or fixed pixel array type display, is considered low frequency information. Since the white line lasts for the entire duration of one horizontal scan line, it represents non-alternating, continuously illuminated information having a comparatively low duty cycle when compared to alternating pixels over one horizontal scan line time frame. Such low frequency display information is illustrated in FIG. 1B, as rows of pixels with constant value.

With the aforementioned in mind, test patterns (e.g., fixed video frames) may be used during post-production testing to verify that display systems meet performance specifications. Those test patterns sometimes use patches (small areas or squares) of horizontal lines alternating white and black in the vertical scan direction next to patches of alternating vertical lines (alternating pixels) along the horizontal scan direction. Since each of these patterns are set to exhibit full white or full black level, they appear to be of equal brightness to the human eye when system bandwidth is flat (i.e., the gain of the display system is substantially uniform between the high frequencies and low frequencies represented).

As system performance in the high frequency domain begins to suffer, the high frequencies roll off and do not attain full output level in comparison to the adjacent low frequency alternating lines. The immediate indication to the observer of the test pattern is that high frequency performance of the system is lacking; and, as the problem persists, the high frequency performance degrades until the patch of alternating pixels appears to be a constant 50% gray level (e.g., a value halfway between black (0%) and white (100%)). Unfortunately, while the educated observer can tell that the display bandwidth is compromised, there is no metric for determining the level of compromise in system bandwidth or high frequency performance.

SUMMARY OF INVENTION

The invention is a method and apparatus for dynamically testing video equipment. Embodiments of the present invention implement a test pattern and procedure by which a test engineer, technician or other observer may approximate a CTF (contrast transfer function) value for an entire video/ graphics transmission system (including the display device), providing an easily obtainable metric for image degradation at high video signal frequencies.

Embodiments of the present invention create bursts of high frequency information interleaved with low frequency information over the display area regardless of aspect ratio. The initial input levels of the low frequency and high frequency information correspond to maximum contrast (i.e., 100%) between light and dark portions. Degradation of the display output for the high frequency information is evident from a graying (i.e., reduction in contrast) of the high frequency output relative to the low frequency output. The test generator is configured to raise or lower the values of the low frequency input signal in response to input from the observer. The observer may thus adjust the contrast of the low frequency information until contrast of the low frequency output visually approximates that of the high frequency output. The percentage value of the low frequency input information at that point can provide the estimated CTF value for the system under test, at the frequency represented by the high frequency portion of the test pattern.

In one or more embodiments, the bursts of vertical alternating lines representing alternating pixels in the horizontal scanning axis may be stationary or may be flashed on and off temporally at a desired flash rate. The flashing of these bursts attracts attention and provides a moving sensation that can augment an observer's speed and accuracy in adjusting the level of the horizontal lines (low frequency information) for attainment of a CTF percentage measurement. When the adjustment of the electronic video/graphics generator is adjusted to attain the CTF percentage, the flashing bursts tends to minimize and nearly disappear when compared visually to the gray level of the low frequency line information. This flashing action augments accuracy of adjustment with the idea being to minimize the intensity of the flashing bursts and at the same time find the CTF percentage easily.

While the flashing embodiment is helpful, the test pattern of the present invention may still be used without it. For instance, the same CTF information can be obtained without flashing the high frequency bursts, but may require more time to easily find the point where the contrast of the horizontal line information most closely matches the contrast of the high frequency bursts.

DETAILED DESCRIPTION

Figure 2:
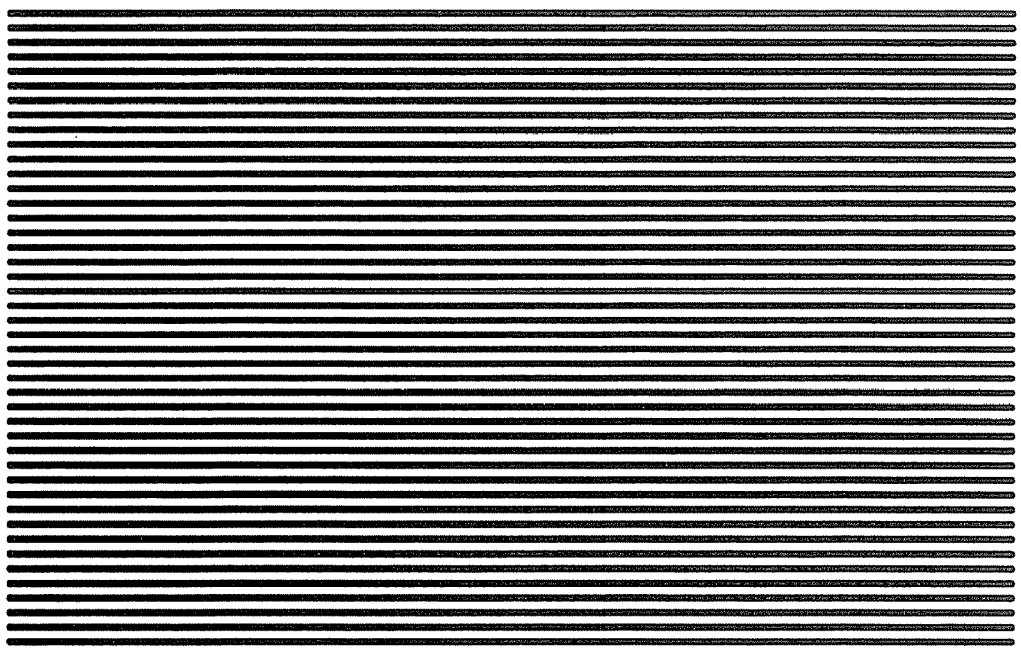
FIG. 2 is an illustration of a test pattern consisting of a full raster, or field, of alternating horizontal lines in accordance with one or more embodiments of the present invention.
Figure 1A:
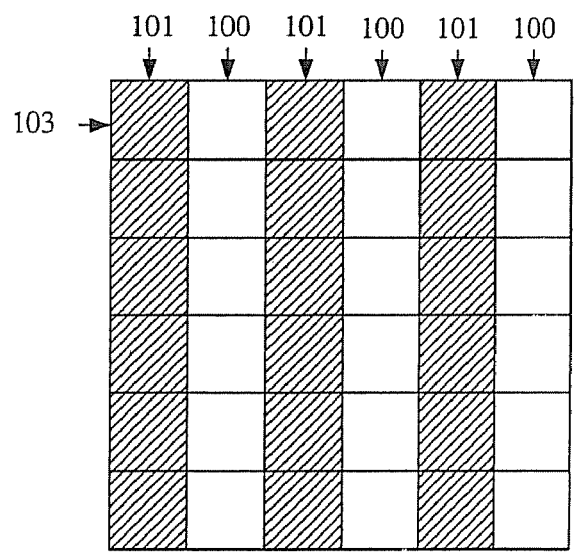
FIG. 1A is an illustration of high frequency video information in the form of alternating vertical columns of light and dark pixels.
Figure 1B:
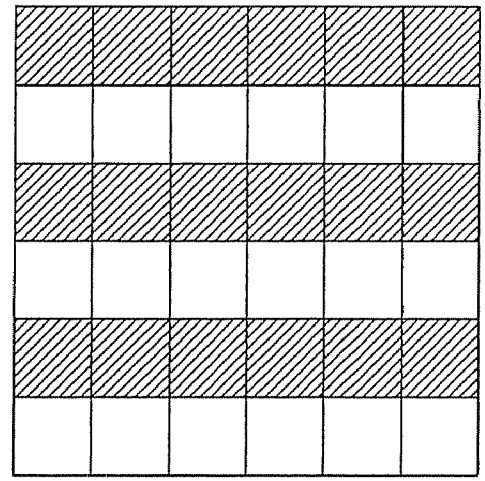
FIG. 1B is an illustration of low frequency video information in the form of alternating horizontal rows of light and dark pixels.

The invention discloses a system and method for dynamically testing video display equipment. In the following description, numerous specific details are set forth to provide a more thorough description of embodiments of the invention. It will be apparent, however, to one skilled in the art that the invention may be practiced without these specific details. In other instances, well known features have not been described in detail so as not to obscure the invention.

Overview

In one or more embodiments of the present invention, a test pattern is implemented with a particular presentation of alternating pixels and lines for visual comparison of contrast between high frequency display information and low frequency (baseline) information. Features of the electronic video/graphics test generator may allow for a particular test pattern to be generated within the test generator or selected from multiple stored test patterns based on specified parameters of the display system under test, such as display resolution and/or aspect ratio. An interface on the test generator allows for user input to adjust the contrast level of the low frequency input portion of the test pattern. The test generator also provides a visual or other user accessible representation of the current contrast value of the low frequency input information. The test engineer or technician is thus able to read a CTF value from the test generator once the contrast value for the low frequency information has been adjusted to approximate the apparent contrast value of the high frequency output information for the system or display under test.

To better facilitate the visual matching of contrast (or apparent intensity) levels, the high frequency information may be flashed (burst) over a static low frequency pattern to emphasize any differences in contrast to the viewer. The frequency with which the high frequency information is flashed may be set, for example, to a frequency for which humans are known to be particularly sensitive. Alternatively, the static (non-flashed) test pattern with regions of high frequency and low frequency information may be used with satisfactory results.

The CTF metric obtained from an embodiment of the present invention specifically indicates to the technician the approximate percentage of peak-to-peak modulation performance of the video distribution system and display by visual inspection and operation of specific features of the video test generator. The concept of the present invention is operable with both analog and digital video/graphics systems.

Use of Test Patterns

The CTF test pattern of one or more embodiments of the present invention may be used as a system testing tool which may or may not include the display device. Since many technicians in the audiovisual systems market work daily with display systems, it is assumed that this test pattern will be used as part of the process for evaluating final system performance against the bandwidth or resolution specifications set forth for the system design. Since test patterns exist within the television testing realm for direct visual determination of system bandwidth (for example, the multiburst pattern) the pattern design of the present invention has greatest application for computer graphics video systems where multitudes of different scan rates and image bandwidth requirements exist. However, this same concept could be used in the realm of television with the proper considerations for test pattern design such that television channel rise/fall time and bandwidth parameters are not exceeded.

First, the pattern consists of a full raster, or field, of alternating horizontal lines as illustrated in FIG. 2. This represents low frequency performance for the system under test. This pattern may be created at the currently generated image scan rate, as well as at any image scan rate within the capabilities of the particular graphics generator, which, in many cases, is a computer graphics card or system. It is assumed that the output contrast value associated with the pattern of FIG. 2 is representative of the contrast value of the display system across the flat portion of the display system bandwidth, or approximately 100%. The input value for the low frequency information is thus a reliable estimate of the 100% CTF baseline value.

Now, a series of vertically oriented lines which when evaluated over the horizontal scan axis of the display is the same as alternating pixels may be superimposed onto the field of full white horizontal lines (low frequency information) as a short burst. The burst interval may be varied to suit the display aspect ratio, for instance, either 4:3 or 16:9 or any other aspect ratio may be used as a construction area for this test pattern. Specifically, several of these bursts are anticipated for use across the field of horizontal lines and intersecting at a right angle. The number of bursts should be selected such that the resulting burst interval length is comparable to the remaining time available for the low frequency lines such that the relative brightness of the vertical burst would appear to the observer to be the same brightness as the horizontal lines of low frequency information which is often used to characterize the flatness of a display system.

Figure 3:
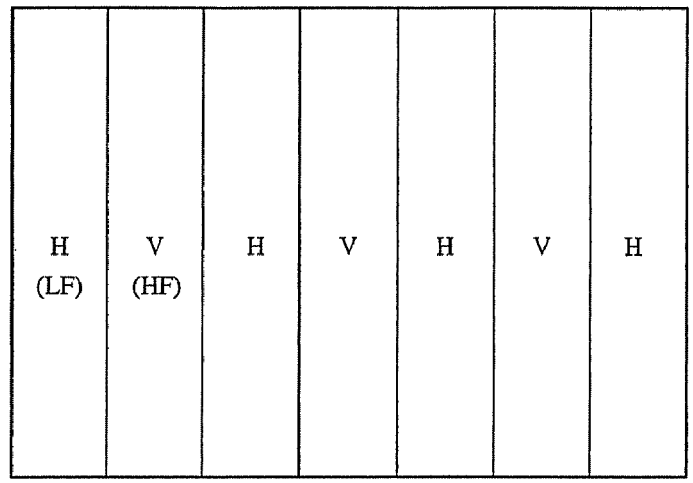
FIG. 3 is an illustration of a test pattern format having alternating columns of high frequency and low frequency video information, in accordance with one or more embodiments of the present invention.
Figure 4:
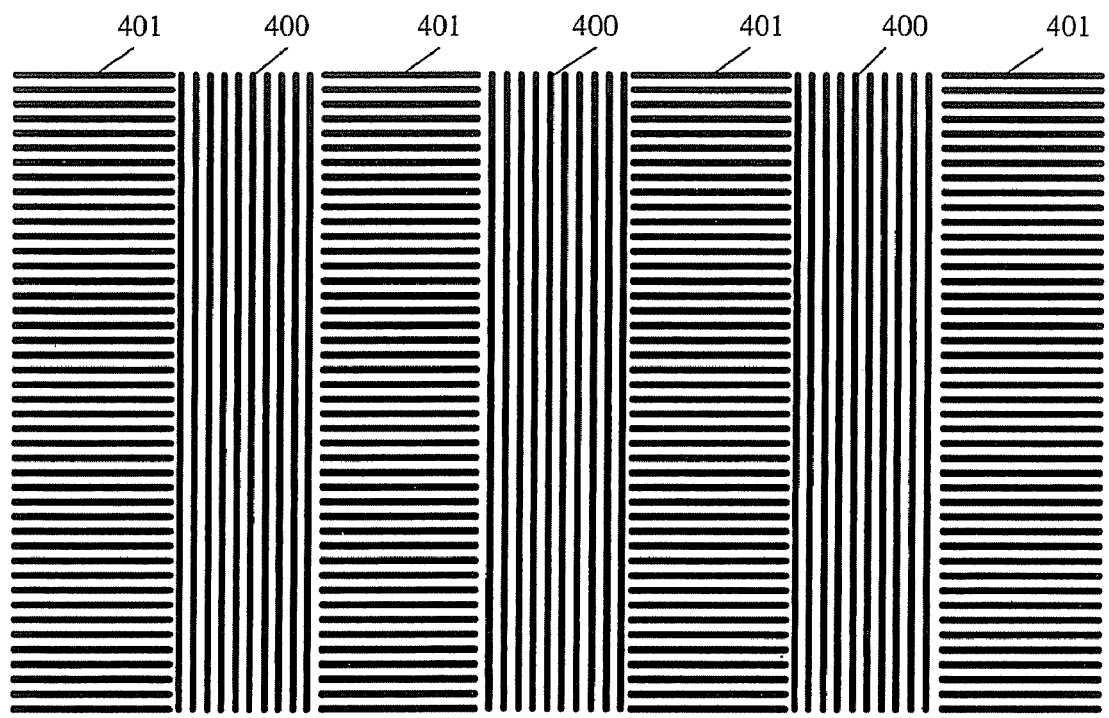
FIG. 4 is an illustration of a test pattern implementing the test pattern format of FIG. 3, in accordance with one or more embodiments of the present invention.

FIG. 3 is an illustration of a test pattern format having columns of low frequency information interlaced with columns or bursts of high frequency information. FIG. 4 is a graphic representation of the resulting test pattern in accordance with an embodiment of the present invention.

As illustrated in FIG. 4, during the time interval that the vertical lines (alternating pixels) burst onto the horizontal lines (alternating lines), the horizontal lines are modulated by the duty cycle of the burst. The number of alternating pixel bursts does not need to be fixed and may vary so as to create an array that equals the remaining visual area of the horizontal lines so as to present bands of lines having equal perceived brightness when system bandwidth is flat, or adequate. Therefore, the number of alternating pixel bursts should be and may be adjusted so as to accommodate any image aspect ratio required.

As illustrated in FIG. 4, the test pattern results in the creation of equal bursts of high frequency information 400 interleaved with low frequency information 401 over the entire display area regardless of aspect ratio. In one or more embodiments of the present invention, high frequency burst 400 may flash to emphasize the visual adjustment cues to a technician or other observer.

The bursts of vertical alternating lines representing alternating pixels in the horizontal scanning axis may be stationary or may be flashed on and off temporally. Any flash rate could be used, but one rate to consider is a one-half second ON and one-half second OFF interval. This rate is generally known to be a frequency of particular sensitivity to most people. The flashing of these bursts attracts attention and provides a moving sensation that will augment adjustment of the level of the horizontal lines (low frequency information) for attainment of the CTF percentage. When the electronic video/graphics generator is adjusted to attain the CTF percentage, the flashing bursts will tend to minimize and nearly disappear when compared visually to the gray level of the low frequency line information. This flashing action augments accuracy of the adjustment process with the intent being to minimize the intensity of the flashing bursts and at the same time find the CTF percentage easily and quickly.

Referring back to FIG. 2, the low frequency pattern appears to be a full field of alternating horizontal lines at the current horizontal scan rate to be used. This is the case when the high frequency bursts are OFF, for example.

In FIG. 4, the test pattern appears with the high frequency bursts gated onto the low frequency lines. The bursts represent alternating pixels along the horizontal line time that represent the highest frequency information available from the current graphics rate in use. When the high frequency bursts switch OFF momentarily, the screen appears as in FIG. 2.

While the flashing embodiment provides a helpful aid to video adjustment, the alternating test pattern (e.g., FIG. 4) may still be effective as a static display (i.e., without flashing). For instance, the same CTF information could be obtained with static high frequency bursts 400, but would require more time to easily find the point where the intensity of the horizontal line information most closely matches the intensity of the high frequency bursts.

Process Embodiment for Obtaining CTF

Figure 5:
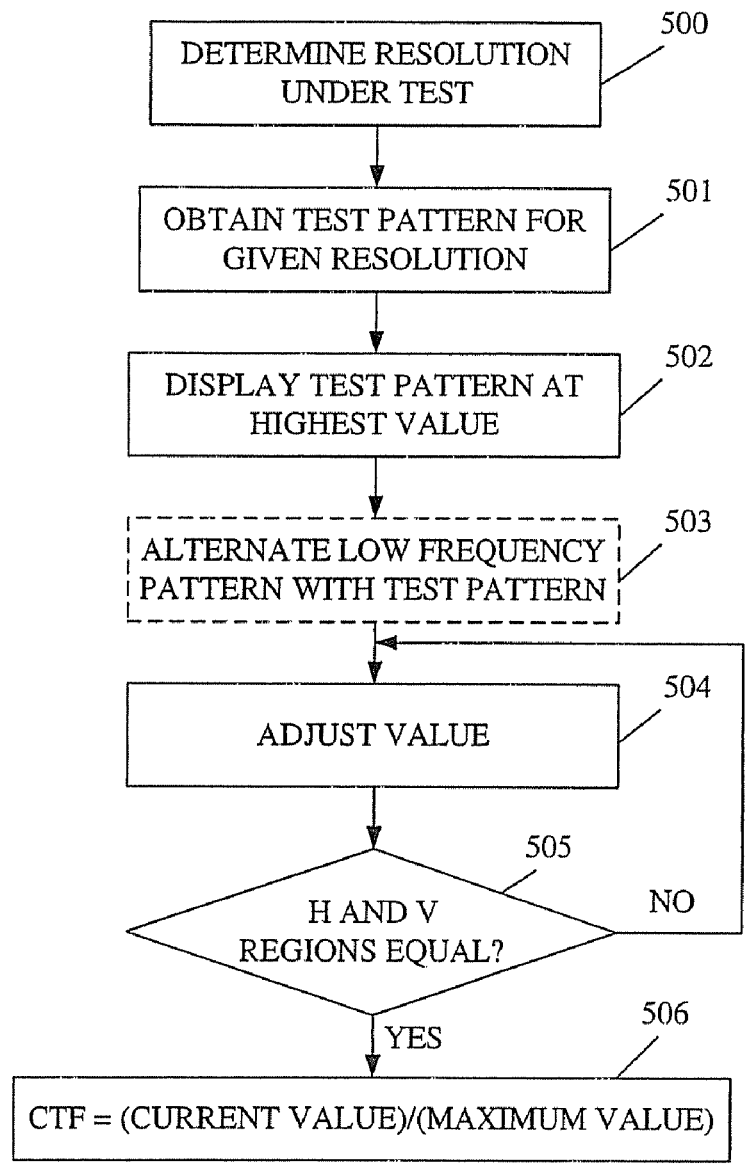
FIG. 5 is a flow diagram of a process for obtaining a contrast transfer function (CTF) measurement, in accordance with one or more embodiments of the present invention.

FIG. 5 is a flow diagram of a process for obtaining a CTF percentage value, in accordance with one or more embodiments of the invention. In block 500, the technician determines the display parameters for the system under test to obtain the appropriate test pattern. Those parameters may include, for example, display resolution and aspect ratio. Other parameters may also be supported by the test generator, such as flash on/off, flash interval, color component (e.g., for testing display performance for an individual color component), etc.

In block 501, the appropriate test pattern is obtained, e.g., based on parameters established in block 500. The test generator may have pre-stored test patterns for multiple resolutions and/or aspect ratios, or the display parameters may be used by a pattern generating algorithm to construct the test pattern data stream (e.g., in real time).

In block 502, the selected test pattern is initially input into the display system under test, with the input information at full value (i.e., alternating 0% and 100%). If the test generator is configured to implement flashing of the high frequency information, then in block 503, the high frequency information is super-imposed over portions of the low frequency information (e.g., at the suggested 0.5 second intervals or at some other fixed or selected timing interval).

In block 504, the technician views the display output, and based upon the apparent difference in intensity between the high frequency information and the low frequency information, adjusts the peak-to-peak input value of the low frequency information in a direction that will minimize the apparent difference in intensity. If, in block 505, the apparent intensity of the low frequency regions of the displayed test pattern does not match the apparent intensity of the high frequency regions, the process returns to block 504 for further adjustment. However, if in block 505, the apparent intensity of the low frequency regions of the test pattern substantially matches the apparent intensity of the high frequency regions, then the CTF percentage value is obtained in block 506 by reading the adjusted peak-to-peak percentage value for the low frequency input. In other words:

$$CTF(HF) = [C(HF)/C_0]*100\%$$
$$= [C_F(LF)/C_1(LF)]*100\%$$
$$= [C_F(LF)/100\%]*100\%$$
$$= C_F(LF)$$

Where CTF (HF) is the CTF value at high frequency, C(HF) is the output contrast value at high frequency, $C_0$ is the baseline contrast value, $C_F(LF)$ is the final adjusted contrast value for the low frequency input information, and $C_I(LF)$ is the initial contrast value (i.e., 100%) for the low frequency input information.

Though the process has heretofore been described in terms of finding a CTF value for the maximum representable video frequency, CTF values for other frequencies may be obtained in similar fashion by adjusting the high frequency portions of the test pattern.

Example Test Environment

Figure 6:
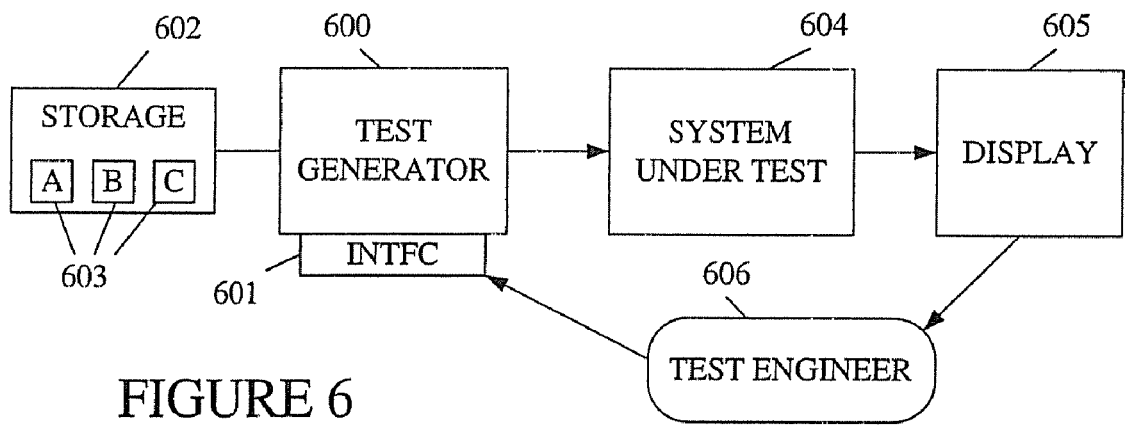
FIG. 6 is a block diagram of a test configuration in accordance with one or more embodiments of the invention.

FIG. 6 is a block diagram of a possible test setup for application of an embodiment of the invention. The setup includes test generator 600 having a user interface 601 (e.g., control inputs and control display) and a data storage component 602. The data storage component 602 may be used, for example, to store test parameters, test programs or scripts and/or pre-generated test patterns 603. The video system 604 that is being tested is coupled to test generator 600 to receive the input video signal. The display output of video system 604 is provided to a display device 605 for viewing by the test engineer, technician, or other observer 606. Alternatively, video system 604 may include a display device.

Most electronic video/graphics test generators 600 have an UP key and a DOWN key (or similar function keys) as part of the operator controls on user interface 601. These keys allow the user 606 to adjust the output level of the horizontal lines. While each line represents full on-time during a horizontal line scan interval, the operator may adjust the specific amplitude (brightness) of the line as a percentage of the excursion from black to white.

The UP and DOWN, or similar keys may be operated so as to change the output level of the horizontal lines as a percentage of full excursion (0%-100%). The current percentage of full white level for the horizontal low frequency information may be presented on the electronic video/graphics generator control display. In accordance with one or more embodiments of the invention, the perceived brightness of the horizontal lines, as presented on display 605, is adjusted by user 606 until it matches the perceived brightness of the vertical line bursts. The percentage of CTF can be read directly from the control display of the electronic video/graphics generator user interface 601. Without using sophisticated frequency analysis equipment, such as a network analyzer, the overall percentage of output level may be generally equated to the flatness of the system bandwidth response.

All video/graphics distribution systems and displays suffer from some amount of bandwidth performance loss due to various issues. For example, the interconnecting cables, like coax cables, in a system design will have the most effect on bandwidth and performance. With the test pattern of an embodiment the present invention, the technician can visually evaluate the final capability of the system by determining a percentage of output level that would be attainable with a like system having negligible signal loss. This is valuable because the system distribution and/or the display device can be evaluated together or independently.

As a troubleshooting tool, the test pattern of an embodiment of the present invention may be used to find the threshold of graphics scan rate and clock frequency, for example, where a system just begins to lose high frequency performance. Conversely, while the test pattern is in operation, compensation equipment may be adjusted in real time to allow the technician to compensate for the distribution loss and restore high frequency performance. For example, in video system 603, an amplifier with pre-emphasis, or band-pass peaking, could be adjusted until the CTF is restored to 100%. This process would only take a few moments to complete while viewing the test pattern with the low frequency amplitude setting on the generator (i.e., the UP/DOWN keys) left at 100%.

Figure 7:
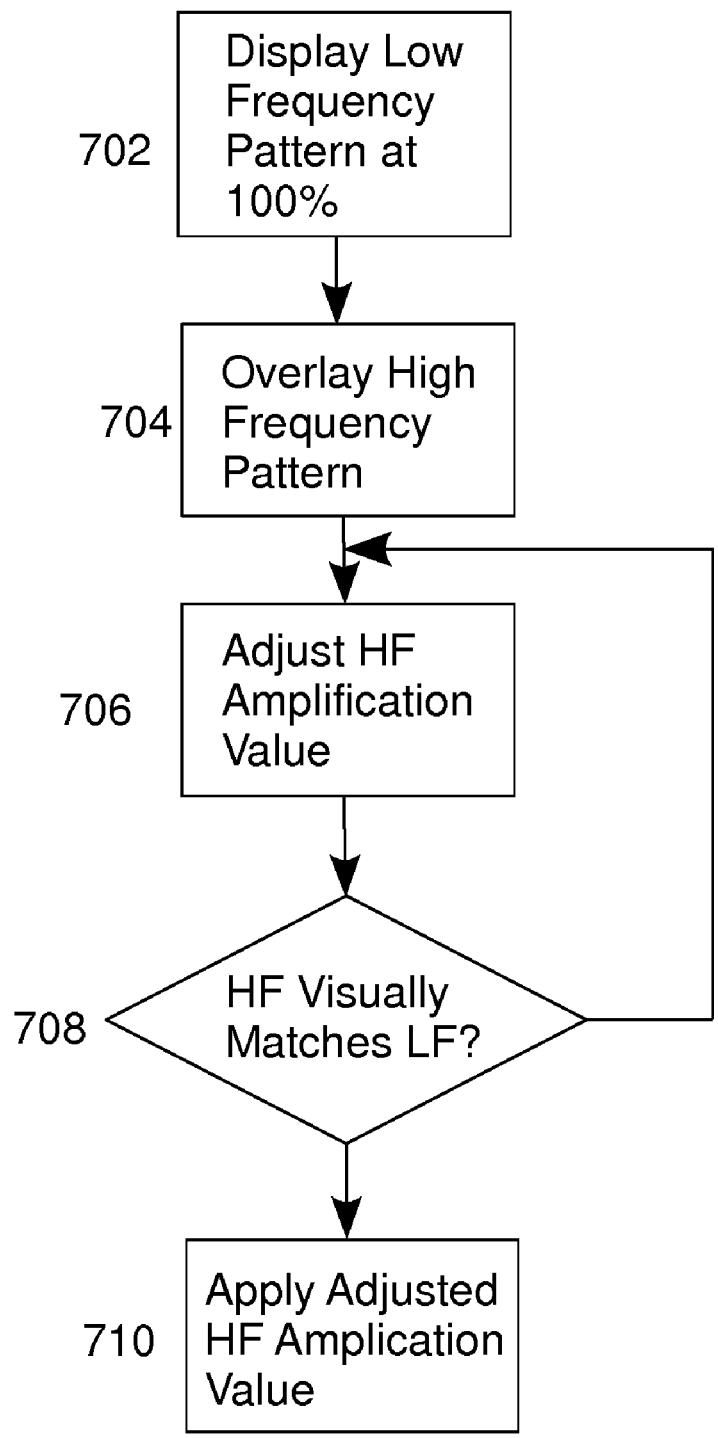
FIG. 7 is a flow diagram of a method for testing video equipment in accordance with one or more embodiments of the invention.

FIG. 7 is a flow diagram illustrating the steps for restoring high frequency response described above. At step 702, a low frequency test pattern is displayed at a 100% amplitude setting. At step 704, a high frequency test pattern is overlayed onto the low frequency test pattern. At step 706, the high frequency amplification value is adjusted until a determination is made at step 708 that the high frequency pattern visually matches the low frequency pattern. At step 710 the adjusted high frequency amplification value is applied to compensate for distribution loss and to restore high frequency performance.

In addition to the above discussion on uses of the pattern, within the RGB domain, the video/graphics test generator may be configured to allow the user to turn off any or all channels of video information via its control panel. This means that the CTF test pattern could be used to evaluate all three channels simultaneously (the primary use) or alternatively could be used to evaluate any of the three video channels (R, G, or B) independently. This option for the technician is important since observation of the high frequency bursts should yield some level of gray under equal, balanced signal performance losses in a system. When performance loss is not balanced between the red, green, and blue video channels, the patch or burst of alternating pixels will appear to be tinted the complementary color of the most affected color channel. This condition would necessitate evaluation of one or more channels independently, to provide the appropriate compensation to reacquire acceptable performance.

Thus, a method and apparatus for dynamically testing video equipment have been described. Particular embodiments described herein are illustrative only and should not limit the present invention thereby. The invention is defined by the claims and their full scope of equivalents.

I claim:

1. A method for testing video equipment comprising:
    obtaining a first test pattern having a first video characteristic;
    obtaining a second test pattern having a second video characteristic;
    displaying said first test pattern in a display system;
    overlaying said second test pattern onto said first test pattern in said display system;
    adjusting an input parameter of said second test pattern until a visual parameter of said first test pattern to matches a visual parameter of said second video characteristic; and
    determining a performance metric of said display system from an adjusted value of said input parameter.

2. The method of claim 1, wherein displaying said first and second test patterns comprises:
    displaying said first test pattern during a first interval; and
    super-imposing said second test pattern over a portion of said first test pattern during a second interval.

3. The method of claim 2 wherein said first video characteristic comprises low frequency information.

4. The method of claim 3 wherein said second video characteristic comprises high frequency information.

5. The method of claim 4, wherein said visual parameter comprises perceived brightness.

6. The method of claim 1 wherein said input parameter of said second test pattern comprises an amplification value.

7. The method of claim 1 wherein an input characteristic of said first test pattern comprises a set value.

* * * * *